(12) United States Patent
McMurtry et al.

(10) Patent No.: US 7,367,128 B2
(45) Date of Patent: May 6, 2008

(54) SCALE READING APPARATUS

(75) Inventors: David R McMurtry, Dursley (GB);
James R. Henshaw, Stroud (GB);
Alexander D. Ellin, Horsley (GB)

(73) Assignee: Renishaw PLC, Gloucestershire (GB)

( * ) Notice: Subject to any disclaimer, the term of this patent is extended or adjusted under 35 U.S.C. 154(b) by 107 days.

(21) Appl. No.: 10/521,168

(22) PCT Filed: Jul. 16, 2003

(86) PCT No.: PCT/GB03/03097

§ 371 (c)(1),
(2), (4) Date: Jan. 14, 2005

(87) PCT Pub. No.: WO2004/008076

PCT Pub. Date: Jan. 22, 2004

(65) Prior Publication Data

US 2005/0229410 A1  Oct. 20, 2005

(30) Foreign Application Priority Data

Jul. 16, 2002 (GB) ................................ 0216488.7

(51) Int. Cl.
*G01D 21/00* (2006.01)
(52) U.S. Cl. ........................................ 33/1 PT; 33/706
(58) Field of Classification Search ................ 33/1 PT, 33/1 N, 706–708
See application file for complete search history.

(56) References Cited

U.S. PATENT DOCUMENTS

| 4,513,512 | A | * | 4/1985 | Fischer ........................ 33/1 N |
| 6,293,021 | B1 | | 9/2001 | Freitag et al. |
| 6,481,115 | B1 | * | 11/2002 | Henshaw et al. ............. 33/645 |
| 6,612,048 | B2 | | 9/2003 | Peterlechner et al. |
| 7,032,317 | B2 | * | 4/2006 | Hertenberger et al. ...... 33/1 PT |
| 2003/0094568 | A1 | | 5/2003 | Meschko |
| 2005/0138822 | A1 | * | 6/2005 | Aikawa et al. ............. 33/1 PT |
| 2005/0235502 | A1 | * | 10/2005 | McMurtry et al. .......... 33/1 PT |
| 2006/0168837 | A1 | * | 8/2006 | Muir ........................... 33/710 |

FOREIGN PATENT DOCUMENTS

| EP | 0 913 669 A2 | 5/1999 |
| EP | 1 094 302 A2 | 4/2001 |
| EP | 1 211 482 A1 | 6/2002 |

* cited by examiner

*Primary Examiner*—Yaritza Guadalupe-McCall
(74) *Attorney, Agent, or Firm*—Oliff & Berridge, PLC

(57) ABSTRACT

A rotary ring system for use in scale reading apparatus comprises a rotary ring (12), provided with scale marks on its surface and at least one intermediate member (24). The at least one intermediate member (24) is fitted between the rotary ring (12) and the machine part (10) on which the rotary ring is to be mounted. Application of a force to the at least one intermediate member adjusts the effective radius of the rotary ring. The at least one intermediate member may be tangentially compliant.

22 Claims, 6 Drawing Sheets

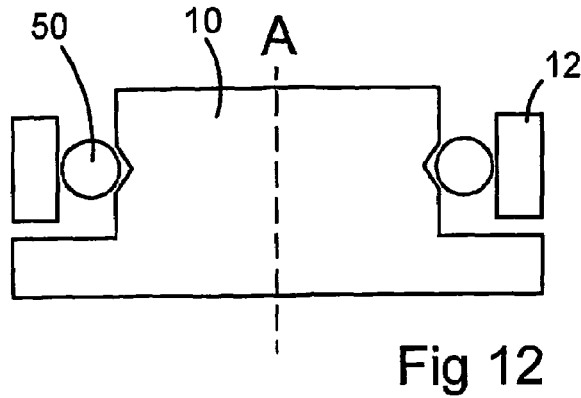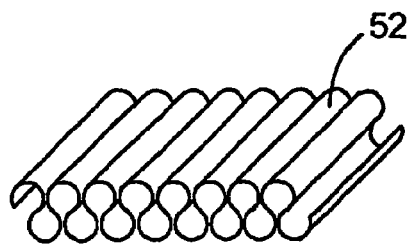
Fig 12          Fig 15
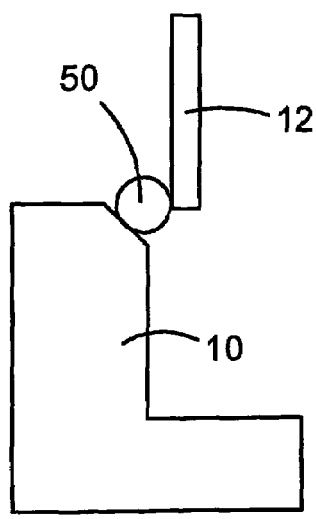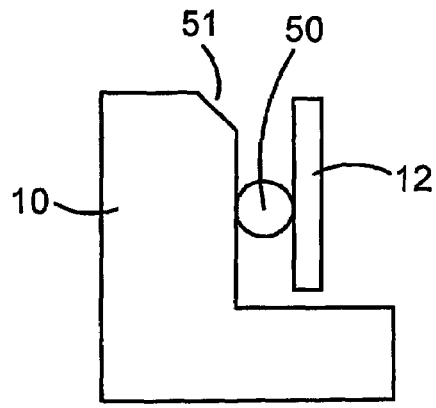
Fig 13A         Fig 13B
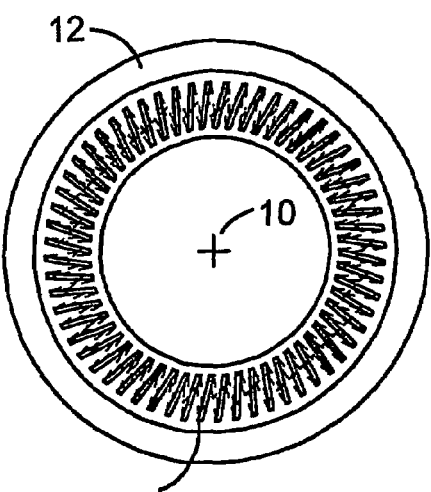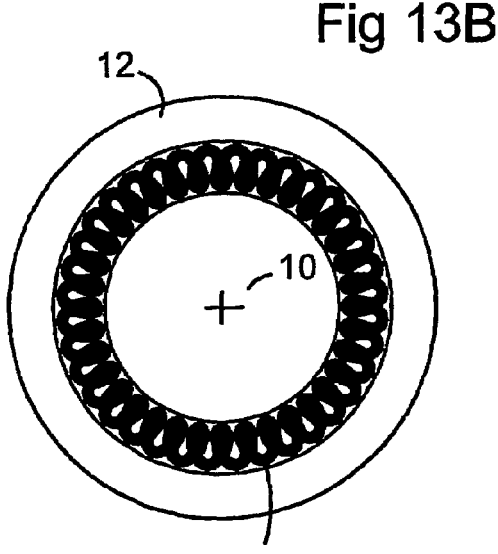
Fig 14          Fig 16

SCALE READING APPARATUS

The present invention relates to apparatus and method for mounting a scale of a scale reading apparatus onto a machine. In particular, the invention relates to apparatus and method for mounting a rotary scale onto a machine.

A known form of opto-electronic scale reading apparatus for measuring relative displacement of two members comprises a scale on one of the members, having scale marks defining a pattern and a readhead in the other of the members. The readhead includes a light source for illuminating the scale and periodic diffraction means for interacting with light reflected from the scale marks to produce interference fringes at the readhead. Relative movement between the scale and the readhead causes the interference fringes to move relative to the readhead. Detecting means are responsive to the movement of the fringes and produce a measure of displacement. Magnetic scale reading apparatus are also known in which the scale comprises a magnetic grating and wherein pulse signals for each unit displacement of the readhead are used to determine a measurement signal.

For measuring rotary displacement, such a scale may be provided on a cylindrical surface which rotates in use with the shaft or other rotary part relative to the readhead. European Patent Application No. 1094302 discloses a ring for mounting on a rotary shaft of a machine which is provided with a scale on its outer circumference. The inner circumference of the ring and the outer circumference of the rotary shaft are both tapered in order to reduce error caused by the ring not sitting concentrically on the rotary shaft or eccentricity of the shaft seating itself. To compensate for eccentricity of the shaft, mounting screws are provided in holes on the ring to adjust the position of the ring until it is concentric with the axis of rotation of the shaft.

The present invention provides a rotary ring system for use in scale reading apparatus comprising:
   a rotary ring, provided with scale marks on a surface thereof, defining a pattern and readable by a readhead of such apparatus;
   at least one intermediate member;
   wherein the at least one intermediate member is fitted between the rotary ring and the part of the machine on which the rotary ring is mounted.

This system enables the radial adjustment of the rotary ring. Preferably the effective radius of the rotary ring may be adjusted by applying a force to one of the at least one intermediate member and rotary ring.

The force applied to one of the at least one intermediate member and the rotary ring may comprise an axial force. Retaining means may be provided to retain the at least one intermediate member on the rotary part of the machine and in addition to apply the force to the at least one intermediate member.

In one embodiment, the force applied to the at least one intermediate member causes deformation of the at least one intermediate member. In another embodiment, the force applied to the at least one intermediate member causes adjustment in the effective external radius of the at least one intermediate member.

In yet another embodiment, the at least one intermediate member is provided with at least one tapered surface such that when the rotary ring and the at least one intermediate member are mounted on a part of the machine the at least one tapered surface of the at least one intermediate member is in contact with a surface of one or both of the rotary part of the machine and the rotary ring.

The at least one intermediate member may be compliant, and may be tangentially compliant. The compliant at least one intermediate member evens out the circumferential tensions of the rotary ring and thus prevents bunching of the scale.

The at least one intermediate member may be flexible. The flexible at least one intermediate member enables it to take up the manufacturing tolerance of the rotary ring system. The flexible at least one intermediate member may comprise, for example, an o-ring.

The at least one intermediate member may comprise, for example, a continuous ring, a split ring or a plurality of segments. The at least one intermediate member may further comprise, for example, a tapered ring, an O-ring, a plurality of ball shaped members, a plurality of rollers or a spring.

Anchor means may be provided to prevent rotation of the rotary ring relative to the part of the machine.

The present invention will now be described by way of example and with reference to the accompanying drawings in which:

FIG. 12 is a cross-section of a rotary ring mounting apparatus in which the intermediate ring system comprises a garter spring;

FIGS. 13A and 13B are schematic illustrations showing the mounting of the intermediate ring system and rotary ring of FIG. 12;

FIG. 14 is a plan view of the rotary ring mounting apparatus shown in FIG. 12;

FIG. 15 illustrates a spring used as an intermediate ring system;

FIG. 16 is a plan view of the rotary ring mounting apparatus using the intermediate ring system shown in FIG. 15;

Figure 1:
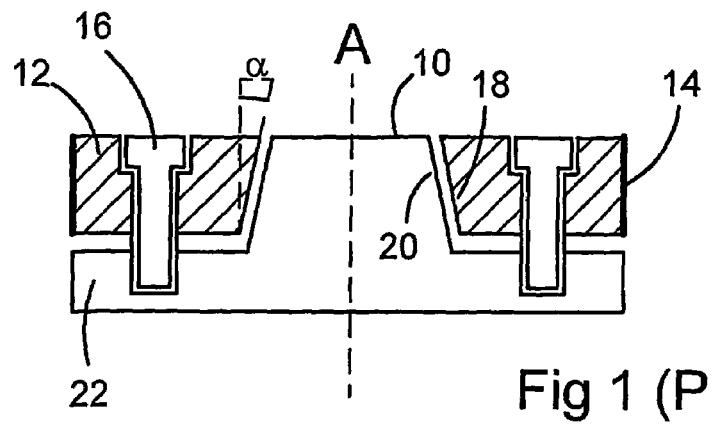
FIG. 1 is a cross-section of known apparatus for mounting a rotary ring on a rotary part of a machine.

FIG. 1 shows a rotary ring 12 mounted on a tapered shaft 10 as disclosed in our earlier European Patent Application No. 1094302. The rotary ring 12 is provided with scale marks 14 which define a pattern and can be read by a readhead (not shown). The scale marks may, for example, define a periodic pattern for an incremental scale or may define a pseudorandom sequence or discrete codewords to form an absolute position scale. The inner surface 18 of the rotary ring 12 is provided with a tapered surface at an angle to the axis A of the ring. The tapered surface removes the need for close tolerance on the diameters of the ring 12 and the shaft 10. In addition, the taper reduces errors caused by the rotary ring 12 not sitting concentrically on the rotary part on which it is mounted. The angle of the taper a relative to the axis A of the ring serves to magnify a small radial error into a large axial error and thus allows precise centring of the ring 12 relative to the shaft taper 10.

Embodiments of the present invention will now be described in which identical reference numbers are used to indicate similar parts. In embodiments 1-4 a tapered intermediate ring is provided between a machine shaft and a rotary ring provided with scale markings on its surface.

Figure 2:
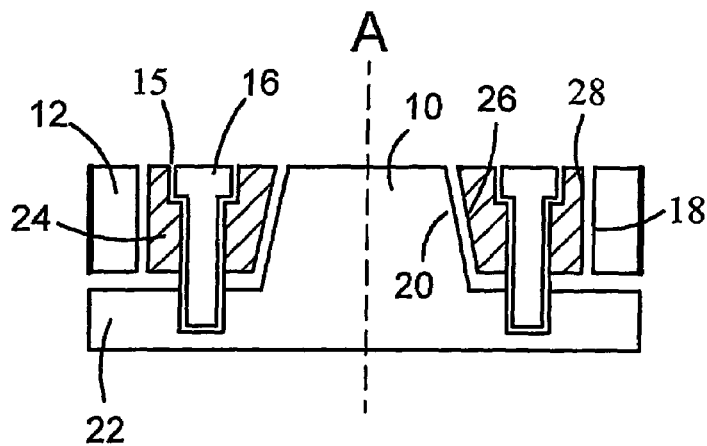
FIG. 2 is a cross-section of a rotary ring mounted on a rotary part of the machine tool with a tapered intermediate ring section.
Figure 3:
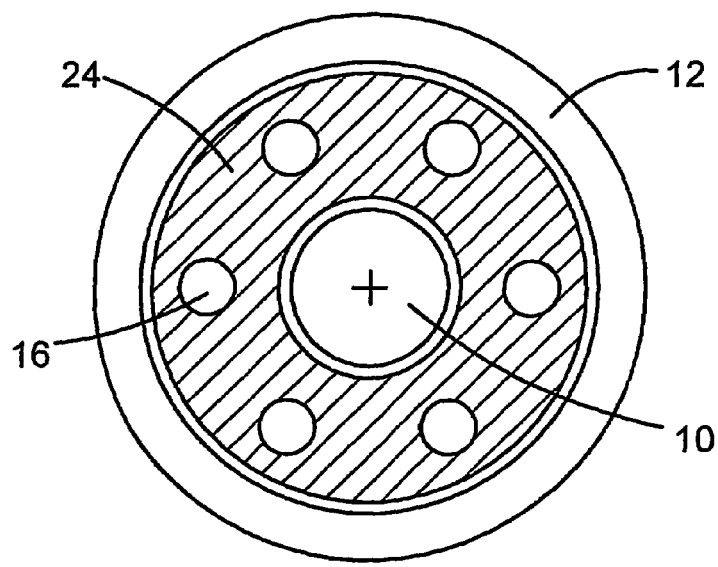
FIG. 3 is a plan view of the apparatus shown in FIG. 2.

A first embodiment of the invention is illustrated in FIGS. 2 and 3. A rotary ring 12 having scale marks 14 defining a periodic pattern on its outer circumferential surface is mounted on a shaft 10 of the machine. The scale marks may be provided directly on a surface of the rotary ring or may be provided in a tape which is secured to a surface of the rotary ring. An intermediate ring 24 is fitted between the rotary ring 12 and the shaft 10. The inner circumferential surface 26 of the intermediate ring 24 is tapered and the shaft 10 is provided with a corresponding tapered surface 20. The intermediate ring 24 is provided with apertures 15 into which mounting screws 16 may be inserted. The mounting screws 16 and the apertures 15 are generally parallel to the axis of rotation A of the shaft 10. The mounting screws 16 may be adjusted to pull the intermediate ring 24 further down the tapered surface 20 of the shaft 10 and thus pushing the adjacent portion of the rotary ring 12 radially outwards. This apparatus thus allows the rotary ring 12 to be adjusted radially. In addition, pulling the intermediate ring 24 down the tapered surface 20 of the shaft 10 takes up the manufacturing tolerance of the rotary ring 12. The mounting screws 16 may be adjusted individually to centre the rotary ring 12 with axis of rotation A of the shaft 10.

Figure 4:
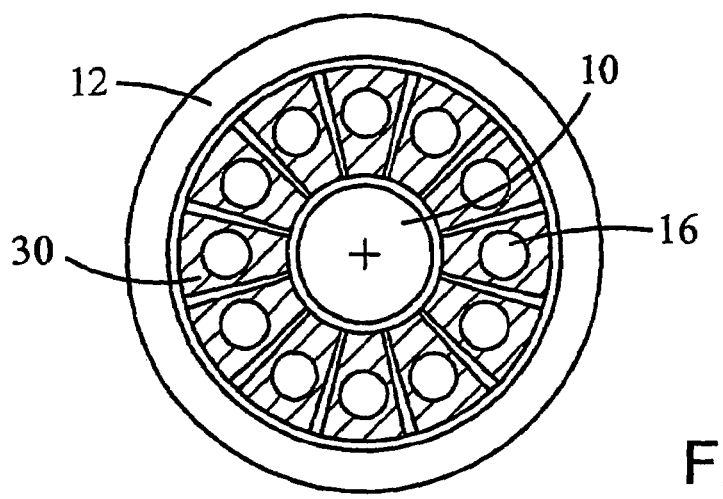
FIG. 4 is a plan view of the apparatus shown in FIG. 3 in which the intermediate ring system comprises a plurality of arcuate segments.

In place of a one-piece intermediate ring 24, arcuate segments 30 may be provided at each mounting screw 16 to the same effect, as shown in FIG. 4.

Alternatively the intermediate ring could comprise a split ring.

The use of a tapered intermediate ring has the advantage that a rotary ring with parallel sides may be mounted on a tapered machine shaft. Such a rotary ring may be cheaper and easier to manufacture than a tapered rotary ring.

Figure 5:
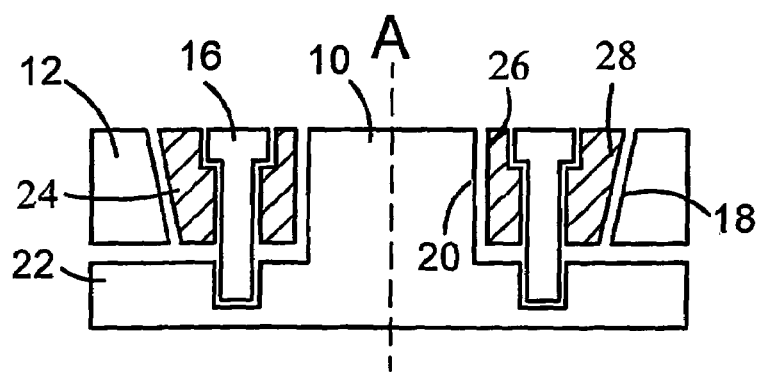
FIGS. 5-7 show cross-sections of variations of the system shown in FIG. 2.

A second embodiment of the invention is shown in FIG. 5. In this embodiment the outer surface 20 of the machine shaft 10 is not tapered and the inner surface 19 of the rotary ring 12 is provided with a taper. The intermediate ring is thus provided with a corresponding tapered outer circumferential surface 28 and non-tapered inner circumferential surface 26. As in the previous embodiment, the mounting screws 16 are tightened to pull the intermediate ring downwards and push the rotary ring 12 outwards. This has the advantage that a tapered rotary ring having the benefits described above may be mounted on a non-tapered machine shaft.

Figure 6:
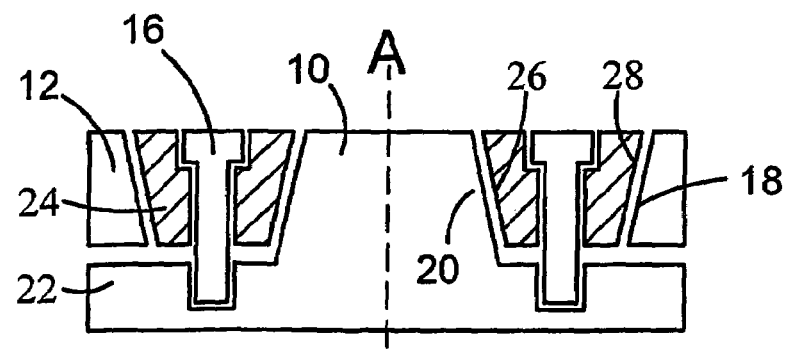

A third embodiment of the invention is shown in FIG. 6. In this embodiment both the outer surface 20 of the machine shaft 10 and the inner surface 18 of the rotary ring 12 are provided with a taper. Both inner and outer circumferential surfaces 26,28 of the intermediate ring 24 are correspondingly tapered. As before, tightening of the mounting screws 16 pulls the intermediate ring 24 down the tapers and pushes out the rotary ring 12.

Figure 7:
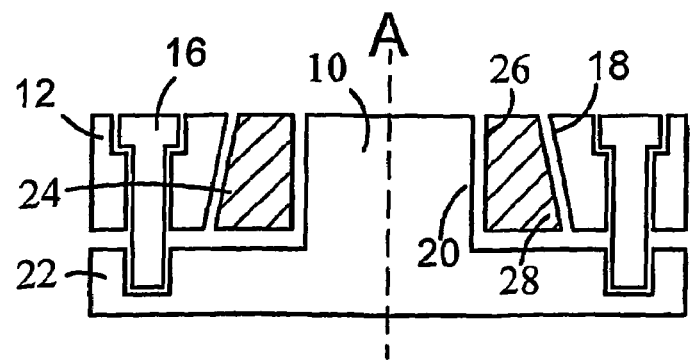

A fourth embodiment of the invention is shown in FIG. 7. As in the second embodiment of the invention, only the outer surface 28 of the intermediate ring 28 and the inner surface 18 of the rotary ring 12 are tapered. However in this embodiment the taper of the intermediate ring is such that its diameter is greater at the bottom than at the top. The rotary ring is provided with the mounting screws 16 such that tightening of the mounting screws 16 pulls the rotary ring 12 down the taper and pushes it radially outwards.

Figure 8:
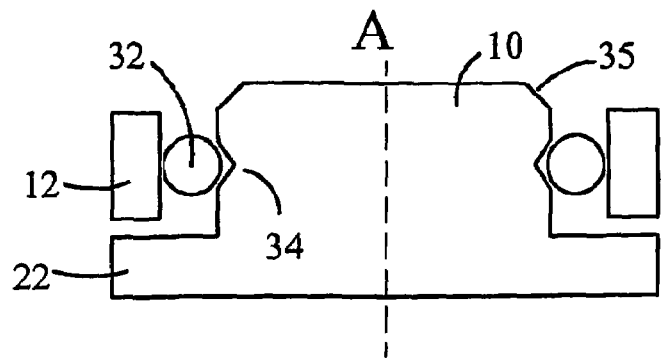
FIG. 8 is a cross-section of a rotary ring mounting apparatus in which the intermediate ring system comprises an o-ring.

The intermediate ring system may be flexible as illustrated in embodiments 5-8. In a fifth embodiment a flexible intermediate ring is provided between the shaft and the rotary ring. The flexible intermediate ring may comprise, for example, an o-ring 32, as shown in FIG. 8. The shaft 10 may be provided with an annular recess 34 to accommodate the flexible o-ring 32. The rotary ring 12 is pushed onto the shaft over the o-ring 32. The shaft 10 may have a tapered upper surface 35 to enable the o-ring 32 and rotary ring to be mounted on the shaft more easily. Use of a flexible intermediate ring system, such as an o-ring, has the advantage that it takes up the manufacturing tolerance of the rotary ring 12.

Figure 9:
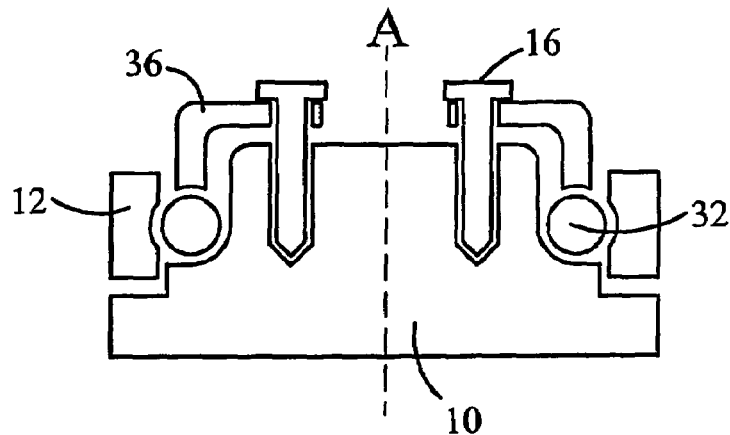
FIG. 9 is a cross-section of a rotary ring mounting apparatus in which the intermediate ring system comprises a deformable o-ring.

A sixth embodiment of the invention is illustrated in FIG. 9. In this embodiment a flexible intermediate ring system (for example an o-ring 32) is positioned between the shaft 10 and the rotary ring 12. A clamp 36 is in contact with the o-ring 32 and may be pushed down onto the o-ring 32 by mounting screws 16. The o-ring 32 is deformed by the pressure from the clamp 36 and thus pushes the rotary ring 12 outwards.

Figure 10:
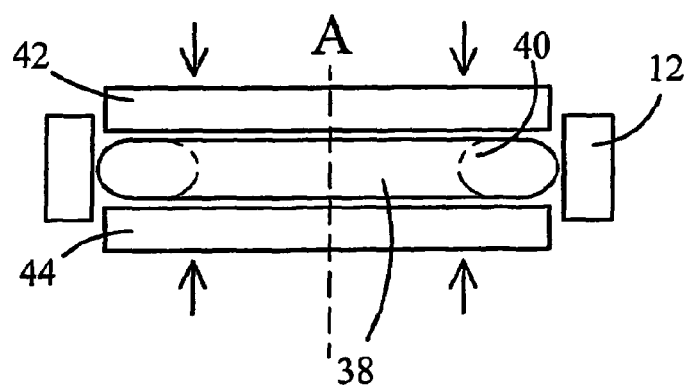
FIG. 10 is a cross-section of a rotary ring mounting apparatus in which the rotary ring is mounted on a deformable disc sandwiched between two rigid discs.

A seventh embodiment of the invention is illustrated in FIG. 10. In this embodiment the rotary ring 12 is mounted on a deformable disc 38 (for example a rubber disc) sandwiched between two rigid discs 44. The rigid discs 44 may be clamped together to squash the deformable disc 38, causing it to bulge outwards, thus pushing the rotary ring 12 radially outwards. The deformable disc may be replaced by a deformable ring as shown by the dashed lines 40.

Figure 11:
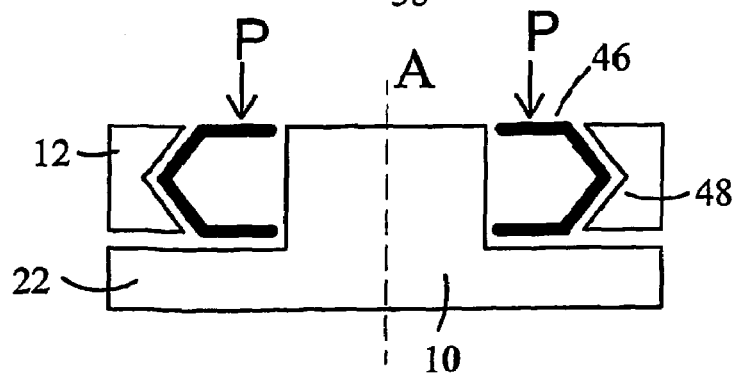
FIG. 11 is a cross-section of a rotary ring mounting apparatus in which the intermediate ring system comprises a metal spring.

An eighth embodiment of the invention is shown in FIG. 11. In this embodiment the intermediate ring system comprises a metal spring 46. The inner surface of the rotary ring 12 may comprise a recess 48 to accommodate the spring 46. As in embodiments 6 and 7, pressure indicated by arrows P may be exerted in the spring in the direction of the arrows to deform the spring 46, thus pushing the rotary ring 12 radially outwards.

The intermediate ring system may be tangentially complaint, as illustrated in FIGS. 8-10. In the embodiments shown in FIGS. 12-16, the intermediate ring between the shaft 10 and rotary ring 12 comprises a tangentially compliant spring. This has the advantage that forces exerted on the rotary ring are spread out over the circumference thus reducing local stresses and thereby reducing bunching of the scale. In a ninth embodiment of the invention, illustrated in FIGS. 12-14, the tangentially compliant spring comprises a garter spring 50.

The garter spring 50 is easily mounted on the machine shaft 10 by placing the garter spring 50 and rotary ring 12 around the top of the machine shaft 20 and pushing the rotary ring 12 over the machine shaft 10 to pull the garter spring 50 into position as shown in FIGS. 13A and 13B. The machine shaft 10 may be provided with a tapered surface 51 at the top to enable the garter spring 50 and rotary ring to be mounted more easily.

In a tenth embodiment of the invention, illustrated in FIG. 16, the tangentially compliant spring has a corrugated cross-section 52 as shown in more detail in FIG. 15.

The intermediate ring system provided between the shaft 10 and the rotary ring 12 may comprise a plurality of elements which are radially rigid and tangentially compliant.

Figure 17:
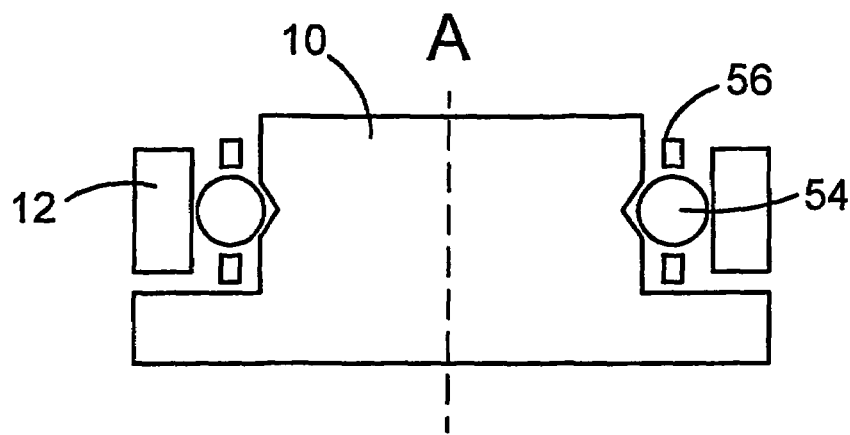
FIG. 17 is a cross-section of the rotary ring mounting apparatus in which the intermediate ring system comprises ball bearings.
Figure 18:
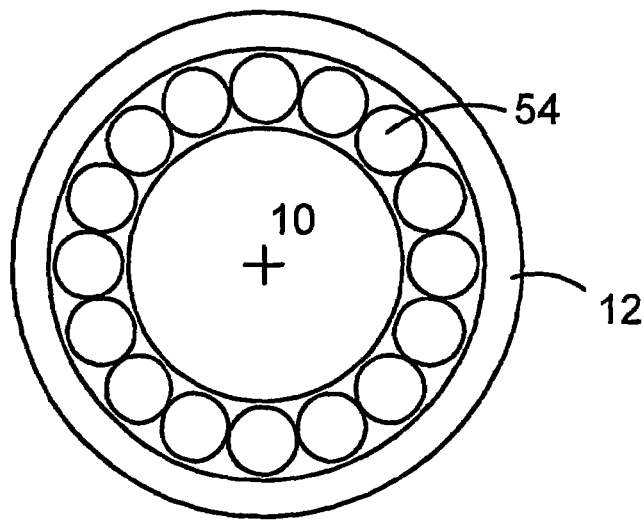
FIG. 18 is a plan view of the apparatus of FIG. 17.

An eleventh embodiment of the invention is illustrated in FIGS. 17 and 18 which show an intermediate ring system comprising an array of ball bearings 54.

The ball bearings may be located in a cage 56. As in the previous embodiment, the tangential compliance of the ball bearings 54 causes the forces exerted on the rotary ring 12 to be spread out, thus preventing bunching of the scale 14. The radial stiffness of the ball bearings ensures radial accuracy of the rotary ring.

As the ball bearings will allow rotation of the rotary ring with respect to the machine shaft, locking means may be provided to ensure the rotary ring rotates together with the machine shaft. The locking means may comprise a pin, or magnet, for example. Likewise, other types of tangentially compliant intermediate ring systems may require locking means to prevent relative rotation between the rotary ring and the machine shaft. In some types of tangentially compliant intermediate ring systems, such as a garter spring, the average stiffness of the intermediate ring system may be sufficient to prevent rotation of the rotary ring relative to the machine shaft.

Figure 19:
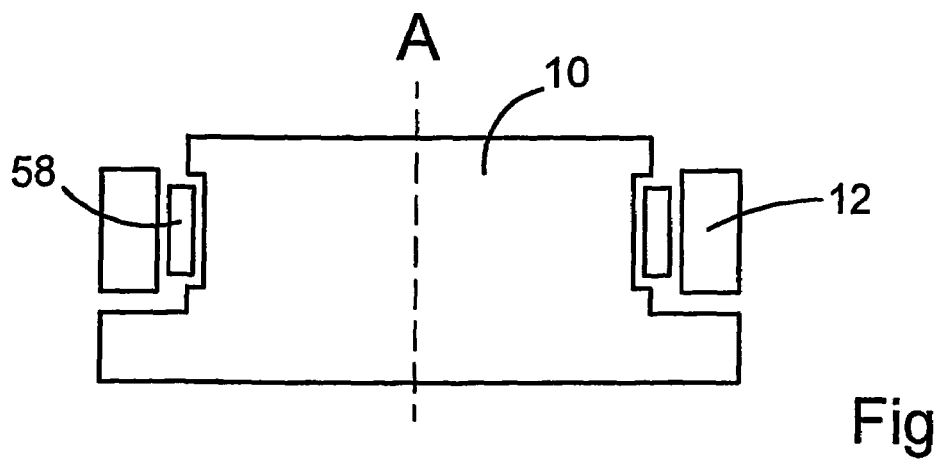
FIG. 19 is a cross-section of the rotary ring mounting apparatus in which the intermediate ring system comprises rollers.

A twelfth embodiment of the invention is shown in FIG. 19 which shows a variation in which the ball bearings 54 have been replaced by rollers 58 to the same effect.

Figure 20:
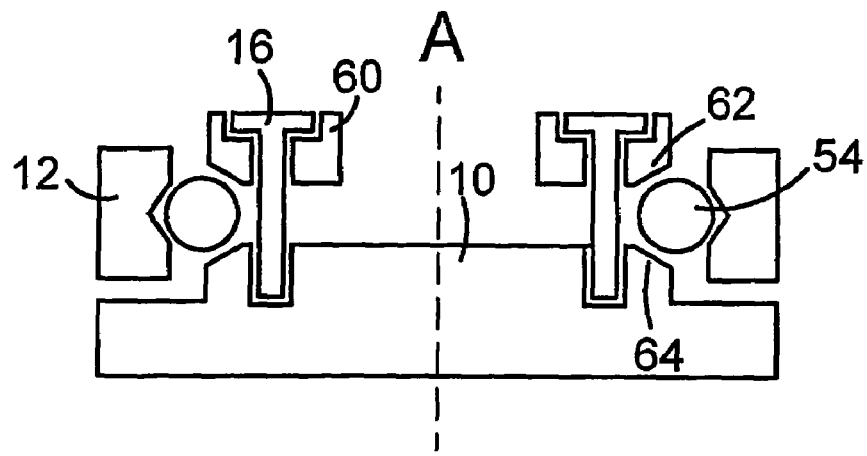
FIG. 20 is a cross-section of the rotary ring mounting apparatus in which the intermediate ring system comprises radially adjustable ball bearings.

In a thirteenth embodiment of the invention illustrated in FIG. 20, the ball bearings 54 are mounted between a surface 64 of the machine shaft 10, a surface 62 of a clamping ring 60 and the rotary ring 12. Mounting screws 16 are provided in the clamping ring 60 which may be tightened to pull the clamping ring 60 downwards, thus pushing the ball bearings 54 and rotary ring 12 outwards. This system thus provides both anti-bunching and radial adjustment.

Figure 21:
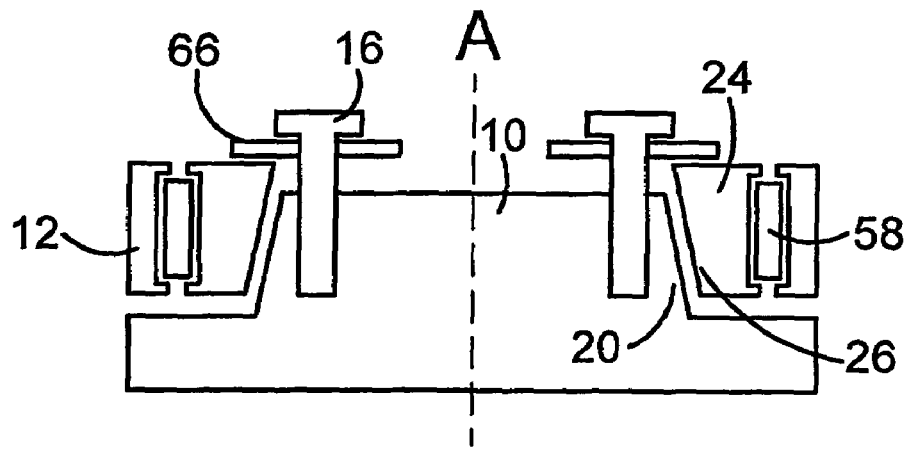
FIG. 21 is a cross-section of the rotary ring mounting apparatus in which the intermediate ring system comprises radially adjustable rollers.

A fourteenth embodiment of the invention illustrated in FIG. 21 also provides both anti-bunching and radial adjustment. Rollers 58 are located between the rotary ring 12 and a tapered intermediate ring 24. The intermediate ring 24 is tapered on its inner surface 26 with the outer surface 20 of the machine shaft 10 being correspondingly tapered. A clamping ring 66 and mounting screws 16 are provided to push the intermediate ring 24 down the taper and provide radial adjustment of the rotary ring 12. The same effect may be achieved by using ball bearings in place of the rollers.

Figure 22:
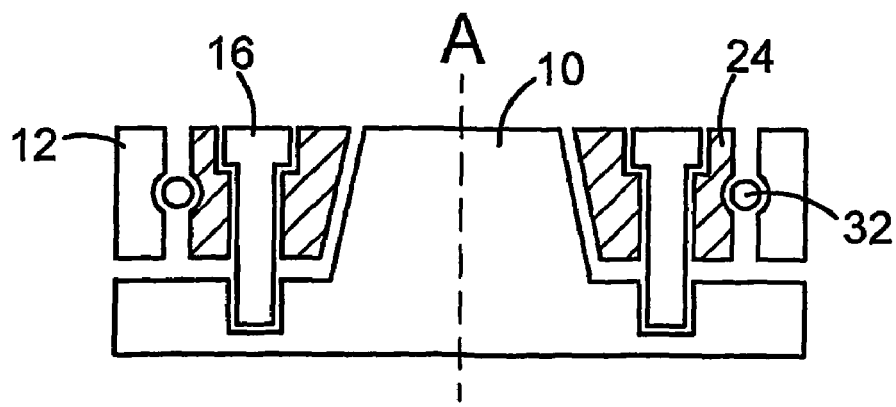
FIG. 22 is a cross-section of the rotary ring mounting apparatus comprising a combination of the apparatus shown in FIGS. 2 and 8.

Many other combinations of the various embodiments described are possible. For example a flexible o-ring 32 may be provided between the rotary ring 12 and a tapered intermediate ring 24 as illustrated in FIG. 22.

Although the embodiments describe a rotary ring with a scale on its outer surface, the scale may be provided on an alternative surface, for example radial scale marks may be provided on the upper surface of the ring. Alternatively the rotary ring may be provided with scale marks on its inner surface, the ring being located inside a rotary bore of a machine with the intermediate ring system being located between the bare inner surface and the rotary ring's outer surface.

The intermediate ring system may be configured such that the rotary ring is supported out of the plane of the rotary part of the machine.

The invention claimed is:

1. A rotary ring system for use in a scale reading apparatus comprising:
   an unbroken rotary ring, provided with scale marks on a surface thereof, defining a pattern and readable by a readhead of the apparatus;
   at least one intermediate member;
   wherein the at least one intermediate member is fitted between the unbroken rotary ring and a part of the a machine on which the rotary ring is mounted.

2. The rotary ring system according to claim 1 wherein applying a force to one of the at least one intermediate member and the unbroken rotary ring secures the unbroken rotary ring in place.

3. The rotary ring system according to claim 2 wherein the force adjusts the effective radius of the unbroken rotary ring.

4. The rotary ring system according to claim 2 wherein the force is applied to the at least one intermediate member.

5. The rotary ring system according to claim 4 wherein applying a force to the at least one intermediate member causes deformation of the at least one intermediate member.

6. The rotary ring system according to claim 4 wherein retaining means are provided to retain the at least one intermediate member on a rotary part of the machine and wherein the force is applied to the at least one intermediate member by the retaining means.

7. The rotary ring system according to claim 4 wherein there is more than one than one intermediate member and wherein the force is applied to every intermediate member.

8. The rotary ring system according to claim 2 wherein the force is an axial force.

9. The rotary ring system according to claim 8 wherein the at least one intermediate member is provided with at least one tapered surface such that when the unbroken rotary ring and the at least one intermediate member are mounted on a part of the machine at least one tapered surface of the at least one intermediate member is in contact with a tapered surface of one or both of the rotary part of the machine and the unbroken rotary ring.

10. The rotary ring system according to claim 9 wherein an axial force may be applied to one of the at least one intermediate member and the unbroken rotary ring such that the tapered surface of the at least one intermediate member and the tapered surface of one or both of the part of the machine and the unbroken rotary ring move relative to one another, causing adjustment in the effective radius of the unbroken rotary ring.

11. The rotary ring system according to claim 1 wherein the intermediate ring system is an unbroken ring.

12. The rotary ring system according to claim 1 wherein the intermediate ring system comprises a split ring.

13. The rotary ring system according to claim 1 wherein the intermediate ring system comprises a plurality of segments.

14. The rotary ring system according to claim 1 wherein the at least one intermediate member is flexible.

15. The rotary system according to claim 1 wherein the at least one intermediate member comprises a plurality of ball shaped members.

16. The rotary ring system according to claim 1 wherein the at least one intermediate member comprises a plurality of rollers.

17. The rotary ring system according to claim 1 wherein the at least one intermediate member comprises a spring system.

18. The rotary ring system according to claim 1 wherein anchor means are provided to prevent rotation of the unbroken rotary ring relative to the part of the machine.

19. A rotary ring system for use in a scale reading apparatus comprising:

- an unbroken rotary ring, provided with scale marks on a surface thereof, defining a pattern and readable by a readhead of the apparatus;
- at least one intermediate member;
- wherein the at least one intermediate member is fitted between the unbroken rotary ring and a part of a machine on which the rotary ring is mounted;
- and wherein applying a force to the at least one intermediate member adjusts the effective radius of the unbroken rotary ring.

20. A rotary ring system for use in a scale reading apparatus comprising:

- an unbroken rotary ring, provided with scale marks on a surface thereof, defining a pattern and readable by a readhead of the apparatus;
- at least one intermediate member;
- wherein the at least one intermediate member is fitted between the unbroken rotary ring and a part of a machine on which the unbroken rotary ring is mounted;
- and wherein the at least one intermediate member is compliant.

21. The rotary ring system according to claim 20 wherein the at least one intermediate member is tangentially compliant.

22. The rotary ring system according to claim 20 wherein anchor means are provided to prevent rotation of the unbroken rotary ring relative to the part of the machine.

* * * * *